United States Patent
Ishikawa et al.

(10) Patent No.: US 6,664,825 B2
(45) Date of Patent: Dec. 16, 2003

(54) RESET FUNCTION INCORPORATED MICROCOMPUTER

(75) Inventors: Tadayoshi Ishikawa, Ehime (JP); Junji Nakatsuka, Osaka (JP); Hiroya Ueno, Osaka (JP); Yoshinobu Tokuno, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/196,215

(22) Filed: Jul. 17, 2002

(65) Prior Publication Data

US 2003/0041234 A1 Feb. 27, 2003

(30) Foreign Application Priority Data

Jul. 18, 2001 (JP) .......................................... 2001-218160

(51) Int. Cl.[7] ................................................. H03L 7/00
(52) U.S. Cl. ....................................... 327/142; 327/198
(58) Field of Search ................................. 327/141, 142, 327/143, 198

(56) References Cited

U.S. PATENT DOCUMENTS

| 5,440,254 A | * | 8/1995 | Sundby ....................... 327/142 |
| 5,485,111 A | * | 1/1996 | Tanimoto ..................... 327/143 |
| 6,418,056 B1 | * | 7/2002 | Willis et al. ................ 365/226 |

* cited by examiner

*Primary Examiner*—Dinh T. Le
(74) *Attorney, Agent, or Firm*—McDermott, Will & Emery

(57) ABSTRACT

The reset function incorporated microcomputer of the present invention, capable of suppressing a variation in reset voltage with a simple configuration, includes a reset decision section. In the reset decision section, a band gap reference circuit generates a predetermined reference voltage VA. A voltage dividing resistance generates a reset voltage VR from the reference voltage VA. A comparator compares the supply voltage VDD applied to the microcomputer with the reset voltage VR, and outputs a reset signal SR.

5 Claims, 6 Drawing Sheets

RESET FUNCTION INCORPORATED MICROCOMPUTER

BACKGROUND OF THE INVENTION

The present invention relates to a technology on microcomputers incorporating a reset function.

Conventionally, in many systems, a one-chip microcomputer is provided with an external reset IC for prevention of a runaway due to supply voltage drop. In recent years, however, in response to requests for cost reduction, one-chip implementation of semiconductors and the like, incorporation of a reset IC in a microcomputer is in progress.

FIG. 6 illustrates a configuration of a conventional reset function incorporated microcomputer. Referring to FIG. 6, a reset signal generation circuit 61 incorporated in a reset block 60 of a microcomputer constantly detects a variation in the supply voltage applied to the microcomputer, and generates a reset signal SR when the supply voltage drops to a reset voltage. The generated reset signal SR propagates along an internal reset signal line, and the reset function of the microcomputer is activated in response to the reset signal SR. Alternatively, a reset signal may be given to the microcomputer via an external reset terminal 62.

The conventional technology described above has the following problems.

The value of the reset voltage used for decision of a drop of the supply voltage is determined depending on the semiconductor fabrication process. Therefore, the value may greatly vary among products, and this may cause a problem that it is not possible to decide whether or not reset operation should be performed using a common reset voltage.

To eliminate a variation in reset voltage, microcomputers may be adjusted after fabrication so that the reset voltage is newly set at a specific value. In this case, however, since adjustment of the reset voltage is required for respective microcomputers, mere implementation of the microcomputers is not enough for operation of products, and thus the fabrication process is disadvantageously complicated.

SUMMARY OF THE INVENTION

An object of the present invention is providing a reset function incorporated microcomputer capable of suppressing a variation in reset voltage with a simple configuration.

Specifically, the reset function incorporated microcomputer of the present invention includes a reset decision section for generating a reset signal instructing execution or non-execution of reset operation. The reset decision section includes: a stabilized power supply circuit for generating a predetermined reference voltage; a reset voltage generation circuit for generating a reset voltage based on the reference voltage generated by the stabilized power supply circuit; and a comparator for comparing the supply voltage applied to the microcomputer with the reset voltage, the reset signal being generated based on the comparison result from the comparator.

According to the invention described above, the reset voltage is generated based on a predetermined reference voltage generated by the stabilized power supply circuit. This suppresses a variation in reset voltage. In other words, the reset function can be operated with a fixed reset voltage common among microcomputers, and thus adjustment after fabrication is no more necessary. Moreover, since a normal microcomputer is originally provided with a stabilized power supply circuit for operating a D/A converter and the like, it is not necessary to newly provide a stabilized power supply circuit for the purpose of the present invention.

Preferably, the microcomputer of the present invention includes a reset decision control section for controlling operation/non-operation of the reset decision section. Therefore, with the control of operation/non-operation of the reset decision section by the reset decision control section, power consumed for reset decision operation can be reduced. In particular, since the stabilized power supply circuit consumes a large amount of current, great reduction in power consumption is possible according to the present invention.

Preferably, the reset decision control section includes: a timing control circuit for operating the reset decision section intermittently; and timing control means for operating the reset decision section by software at a predetermine timing, and operation/non-operation of the reset decision section is controlled with the timing control means when the microcomputer is in a normal operation mode, and is controlled with the timing control circuit when the microcomputer is in a low current consumption mode in which the microcomputer does not execute software. With this configuration, the timing control circuit controls operation/non-operation of the reset decision section in the low current consumption mode. Therefore, reset recognition is possible in the low current consumption mode without the necessity of software operation, and thus current consumption can be reduced.

Preferably, in the microcomputer of the invention, the reset decision section includes output control means for outputting a signal instructing non-execution of reset operation as the reset signal irrespective of the comparison result from the comparator as long as the operation of the microcomputer satisfies predetermined conditions. With this configuration, it is possible to avoid occurrence of reset for a time period during which a problem may occur if reset occurs. This enables stable operation of a system using the microcomputer of the invention.

DESCRIPTION OF THE PREFERRED EMBODIMENTS

Hereinafter, preferred embodiments of the present invention will be described with reference to the accompanying drawings.

Embodiment 1

Figure 1:
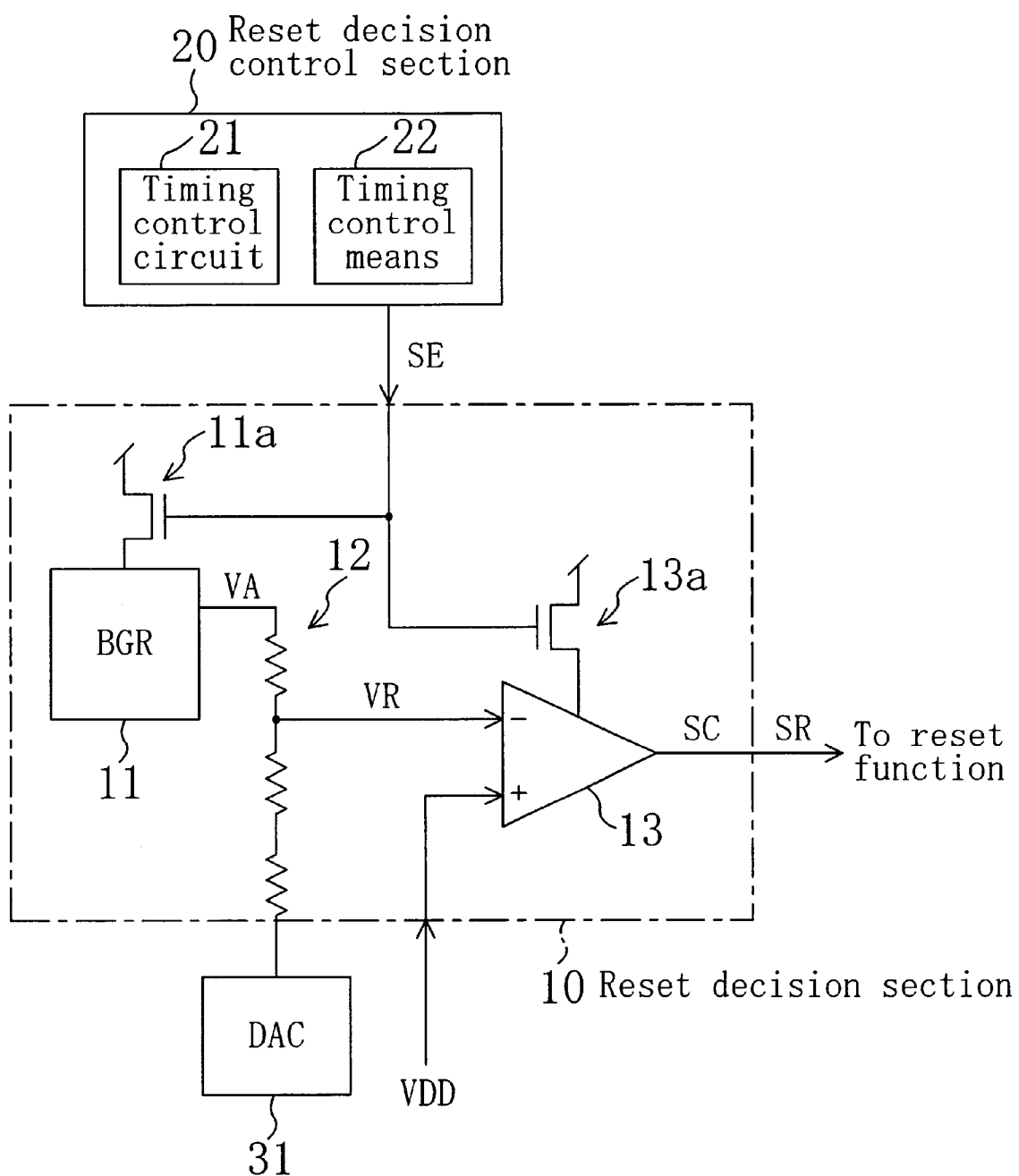
FIG. 1 is a block diagram of part related to reset decision of a reset function incorporated microcomputer of Embodiment 1 of the present invention.

FIG. 1 is a block diagram of a reset block related to reset decision of a reset function incorporated microcomputer of Embodiment 1 of the present invention. Referring to FIG. 1, the reset block includes a reset decision section 10 for generating a reset signal SR instructing whether or not reset operation should be performed, and a reset decision control section 20 for controlling the operation of the reset decision section 10 with a permission signal SE. The operation of the reset decision control section 20 will be described later.

The reset decision section 10 includes: a band gap reference (BGR) circuit 11 as the stabilized power supply circuit generating a predetermined stable reference voltage VA; a voltage dividing resistance 12 as the reset voltage generation circuit generating a reset voltage VR by dividing the reference voltage VA; and a comparator 13 for comparing the reset voltage VR with the supply voltage VDD applied to the microcomputer. The reset signal SR is generated based on the comparison result SC from the comparator 13. The band gap reference (BGR) circuit 11 is inherently provided in the microcomputer for operation of a D/A converter 31.

The reset signal SR is sent to the reset function of the microcomputer. The reset function operates when the reset signal SR is active, to thereby prevent a runaway of the microcomputer. Another reset signal may be supplied from outside the microcomputer in addition to the reset signal SR.

The reset decision section 10 also includes: a first switch 11a for switching operation/non-operation of the band gap reference (BGR) circuit 11, and a second switch 13a for switching operation/non-operation of the comparator 13. The first and second switches 11a and 13a, which receive the permission signal SE output from the reset decision control section 20, permit operation of the band gap reference circuit 11 and the comparator 13 when the permission signal SE is active and halt the operation of the band gap reference circuit 11 and the comparator 13 when the permission signal SE is inactive. By this halt of the operation of the band gap reference circuit 11 and the comparator 13 with the permission signal SE, power consumption of the reset decision section 10 can be reduced.

Once the permission signal SE is made active, the band gap reference circuit 11 is first operated, generating the stable reference voltage VA. Based on the reference voltage VA, the voltage dividing resistance 12 generates the stable reset voltage VR. The comparator 13 is then operated, comparing the reset voltage VR with the supply voltage VDD applied to the microcomputer. When the supply voltage VDD is equal to or less than the reset voltage VR, the reset signal SR is made active based on the comparison result SC. Upon receipt of the active reset signal SR, the reset function of the microcomputer is operated, to enable halting of the operation of the microcomputer before possible occurrence of a runaway.

As described above, in this embodiment, the reset voltage VR is generated based on the predetermined reference voltage VA output from the band gap reference circuit 11. Therefore, it is possible to suppress a variation in reset voltage VR among microcomputers. In other words, the reset function can be operated with a fixed reset voltage common among microcomputers, and thus adjustment after fabrication is no more necessary. Moreover, since a normal microcomputer is inherently provided with a stabilized power supply circuit for operating the D/A converter 31 and the like, it is not necessary to newly provide a stabilized power supply circuit for the purpose of the present invention.

The reset decision section 10 may be operated continuously, omitting provision of the reset decision control section 20. In this case, the power consumption will be larger but the device configuration will be simpler, compared with the case shown in FIG. 1. In other words, if the current consumption of the band gap reference circuit 11 and the like can be made sufficiently small, the reset decision control section 20 is not necessarily required.

<Control of Reset Decision>

Control of permission/blocking of the reset decision operation can be realized both by software and by hardware. The reset decision control section 20 includes a timing control circuit 21 for operating the reset decision section 10 intermittently and a timing control means 22 for operating the reset decision section 10 by software at a predetermined timing.

The timing control circuit 21 can be easily configured by use of a timer counter for counting the clock of the microcomputer, or by use of charge/discharge of a capacitor, for example. In this way, the permission signal SE can be made active intermittently at a predetermined cycle.

The timing control means 22 can be realized in two ways basically. In one of the ways, a software program that activates the permission signal SE is started at predetermined time intervals using a timer interrupt function, a basic function of microcomputers. According to this way, the time intervals at which reset decision is executed can be set long, compared with the intermittent operation by hardware. This reduces the frequency of the operation of the reset decision section 10, and thus the power consumption can be reduced more greatly.

Figure 2:
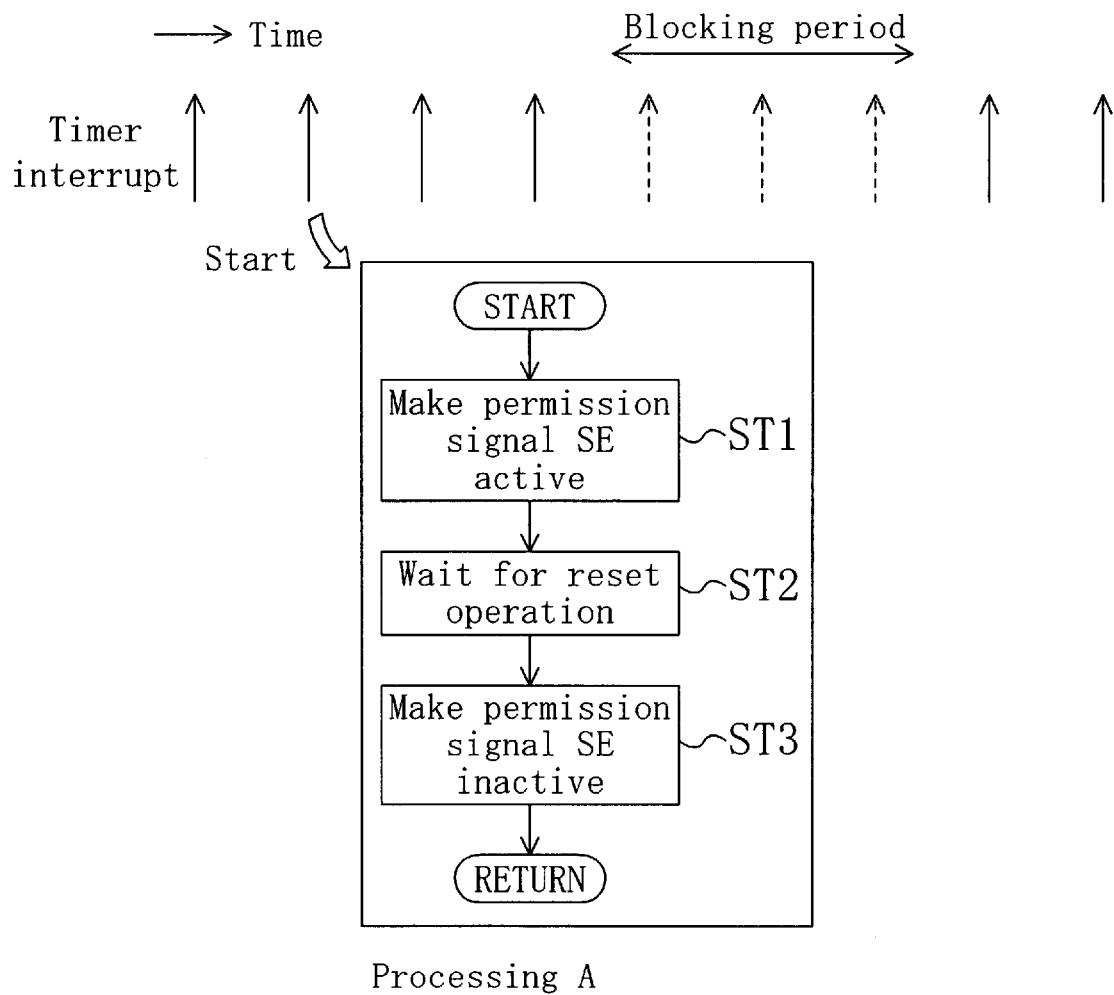
FIG. 2 is a conceptual illustration of control of reset decision operation using timer interrupts.

FIG. 2 is a conceptual illustration of control of reset decision operation using timer interrupts. As shown in FIG. 2, processing A for operating the reset decision section 10 is started every occurrence of a timer interrupt. In processing A, the permission signal SE is made active (step ST1) to put the reset decision section 10 in the operable state. The reset decision section 10 is operated for a predetermined time period (step ST2). Thereafter, the permission signal SE is made inactive (step ST3) to block the operation of the reset decision section 10. By this series of operation, the reset decision can be executed intermittently. Step ST2 may be omitted because some degree of time is required for execution of the instruction step.

Because the above operation is controlled by software, it is possible to block timer interrupts for a certain time period. For example, if reset is imposed in the middle of data write from the microcomputer to an EEPROM or the like, the data may possibly change and this may cause a problem. In such a case, therefore, the timer interrupts may be blocked by software for a time period during which a problem may occur if reset operation is executed, to thereby prevent occurrence of reset.

In the other way of realization of reset decision operation control, a routine for execution of reset decision is added to software processing for controlling an actual system only at a timing at which execution of reset decision is desired. According to this way, reset decision can be operated only at a timing at which reset detection is necessary. For example, when the microcomputer is used for a product such as a blood sugar meter, reset detection may be executed only when the blood sugar meter is powered up and made operable. By this reset operation, power for the reset decision section 10 is only necessary once at the power-up, and thus further reduction in power consumption is possible.

In this embodiment, the timing control circuit 21 and the timing control means 22 are switched to each other appropriately for control of the reset decision section 10. More specifically, the reset decision operation is controlled with the timing control means 22 by software during normal operation of the microcomputer. During a low power consumption mode in which the microcomputer does not execute software, however, the reset decision operation is intermittently executed with the timing control circuit 21.

Figure 3:
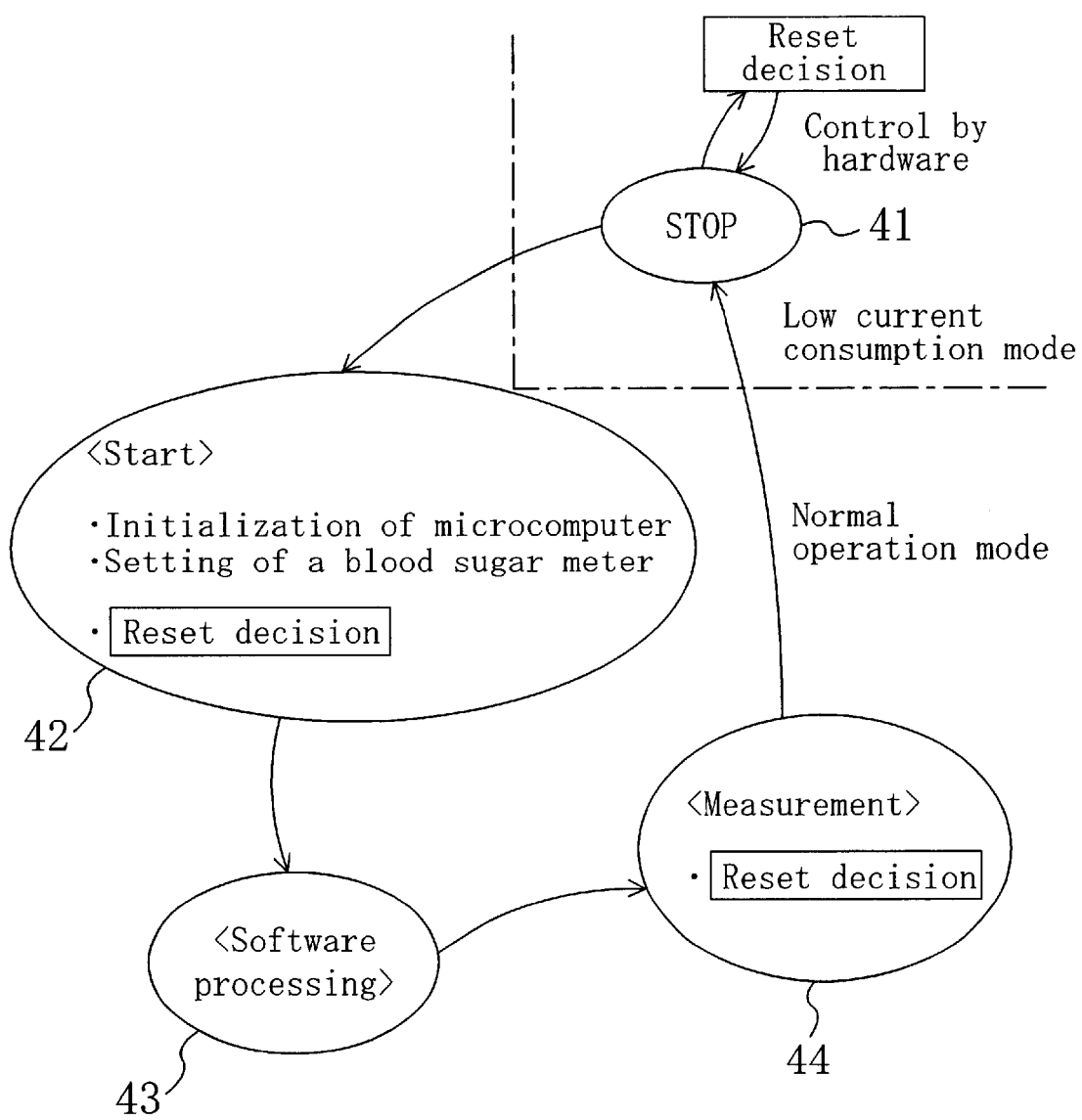
FIG. 3 is a state transition diagram conceptually illustrating control of reset decision operation in Embodiment 1 of the present invention.

FIG. 3 is a state transition diagram conceptually illustrating control of the reset decision operation in this embodiment. In FIG. 3, assume that the microcomputer is mounted in a blood sugar meter. In state 41 in which the blood sugar meter does not operate, the reset decision operation is intermittently executed with the timing control circuit 21. Once the blood sugar meter is activated (state 42), the reset decision operation is executed by software, together with initialization of the microcomputer and setting of the blood sugar meter. Software processing is then performed (state 43), and thereafter the reset decision operation is again executed by software during measurement (state 44).

In the low current consumption mode in which the software of the microcomputer is not executed, control of the reset decision operation should advantageously be executed by hardware from the standpoint of power consumption. If it is intended to execute the control by software, the low current consumption mode must be cancelled to resume the state permitting software operation although the software of the microcomputer is in the non-execution state. This causes additional power consumption by software operation. In this embodiment, however, in which control of the reset decision operation is executed with the timing control circuit 21, it is not necessary to cancel the low current consumption mode. Therefore, reduction in power consumption is possible by an amount that would otherwise be required for such software operation.

Figure 4:
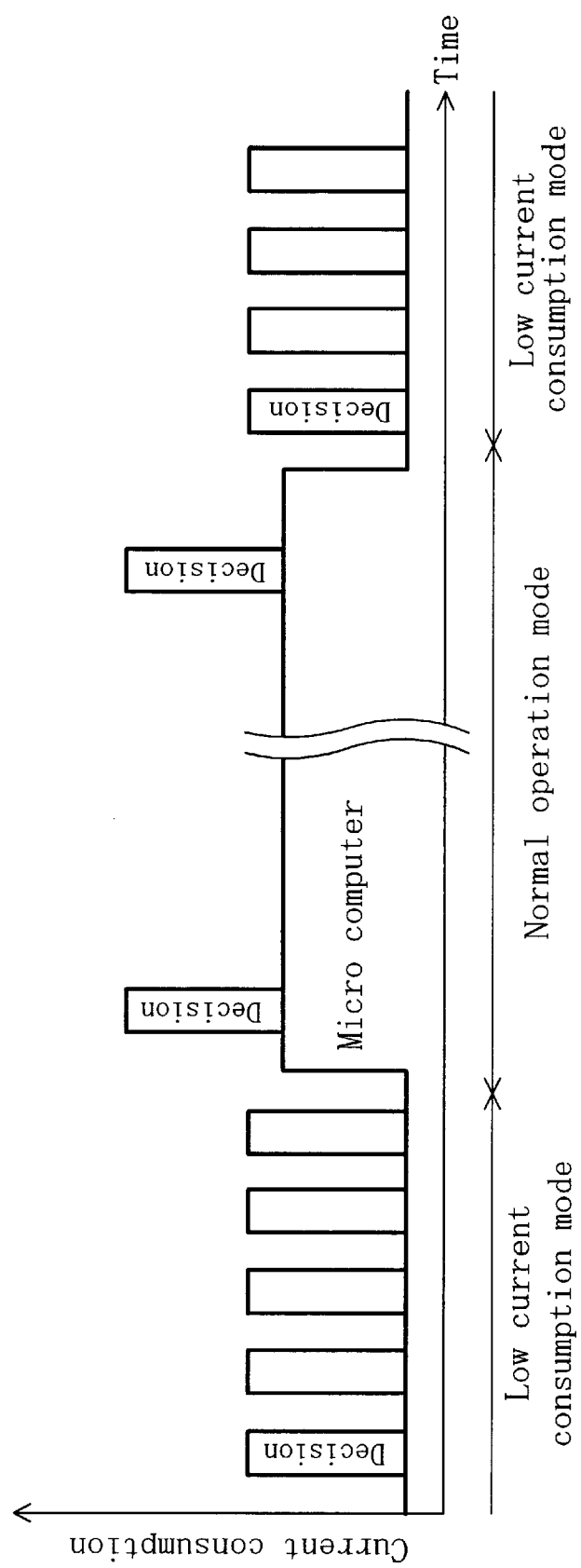
FIG. 4 is a graph conceptually showing the change in current consumption with time in Embodiment 1 of the present invention.

FIG. 4 is a graph conceptually showing the change of the consumed current with time in this embodiment. As is apparent from FIG. 4, in the low current consumption mode, the reset decision operation is executed intermittently with the timing control circuit 21. In this mode, therefore, the current consumption greatly decreases compared with the case of constant execution. In this mode, also, in which no software is executed, the current consumption of the microcomputer itself is small. In the normal operation mode, a routine for executing reset decision is added to a software program for actual system control. Therefore, the time intervals for the reset decision operation can be made considerably long compared with those in the low current consumption mode, and this suppresses increase of the current consumption.

Control of the reset decision operation can also be executed in various ways other than the combined way described above. For example, the reset decision operation may be constantly controlled with only the timing control circuit 21, or with only the timing control means 22. Alternatively, the timing control circuit 21 may be omitted, and the reset decision operation may be executed by software control using timer interrupts in the low power consumption mode.

Embodiment 2

Figure 5:
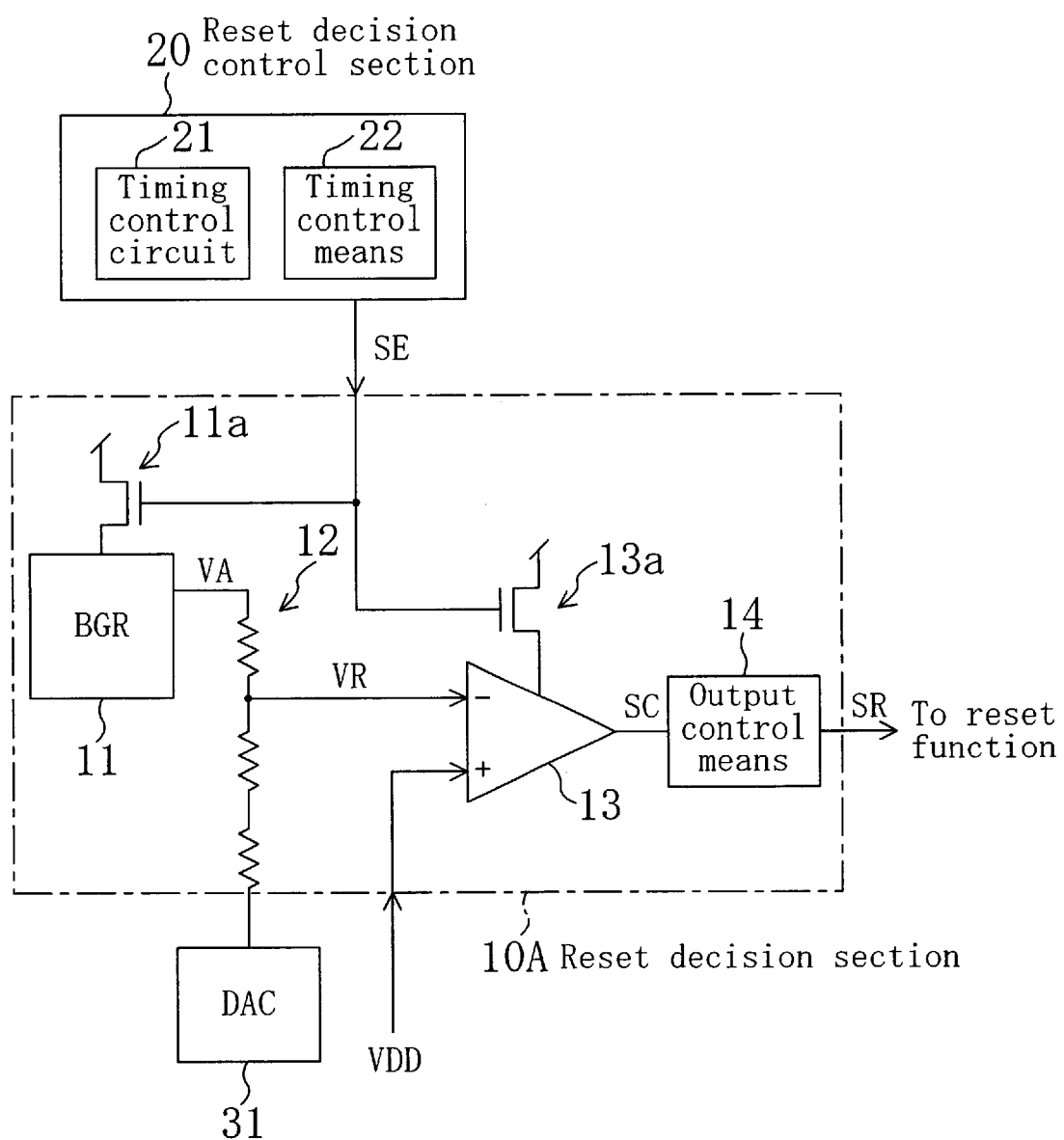
FIG. 5 is a block diagram of part related to reset decision of a reset function incorporated microcomputer of Embodiment 2 of the present invention.
Figure 6:
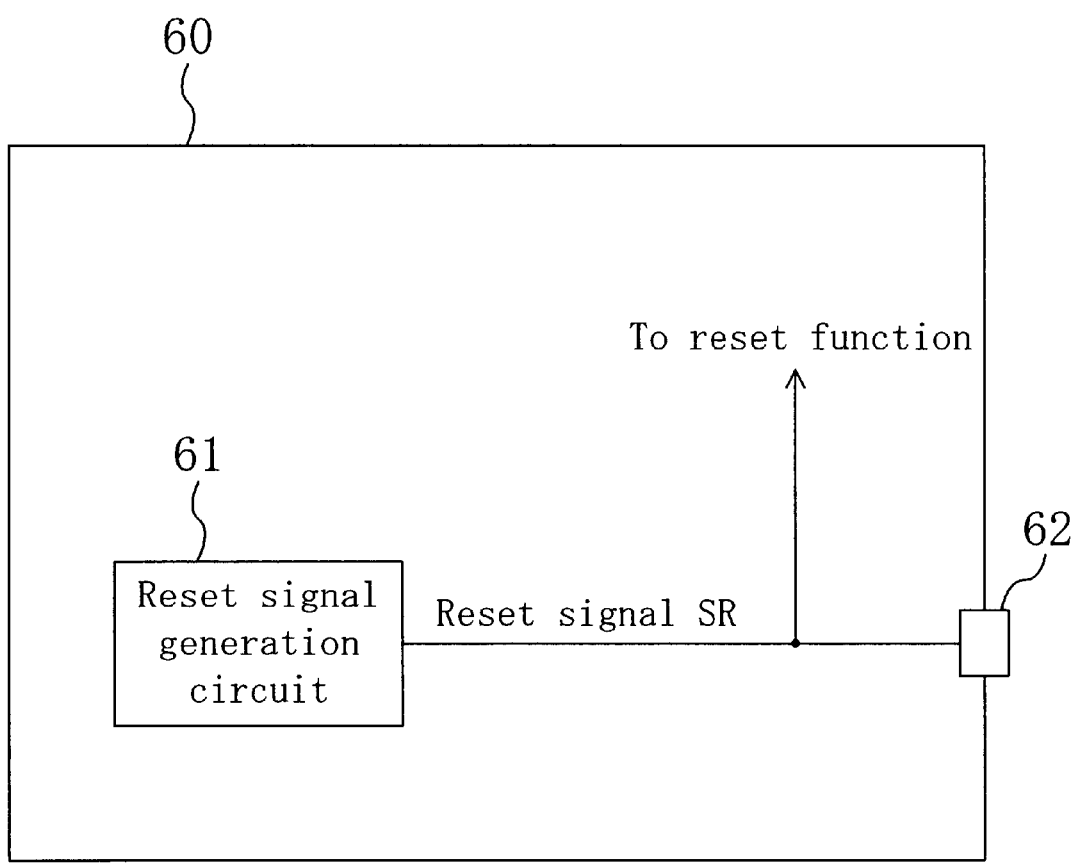
FIG. 6 is a block diagram of part related to reset decision of a conventional reset function incorporated microcomputer.

FIG. 5 is a block diagram of a reset block related to reset decision of a reset function incorporated microcomputer of Embodiment 2 of the present invention. In FIG. 5, the same components as those in FIG. 1 are denoted by the same reference numerals, and the description thereof is omitted here. Referring to FIG. 5, a reset decision section 10A includes an output control means 14 for activating the interrupt function of the microcomputer in response to the comparison result SC from the comparator 13. The output control means 14 makes the reset signal SR active when recognizing that the comparison result SC is active in an interrupt routine.

More specifically, when the supply voltage VDD applied to the microcomputer becomes equal to or less than the reset voltage VR, the comparison result SC from the comparator 13 becomes active, and then the output control means 14 activates the interrupt function of the microcomputer. When it is further recognized that the comparison result SC is active in an interrupt routine, the reset signal SR is made active, to reset the microcomputer.

The output control means 14 has a function of blocking activation of the interrupt routine when the operation of the microcomputer satisfies predetermined conditions. More specifically, the reset signal SR is kept inactive irrespective of the comparison result SC from the comparator 13 as long as the operation of the microcomputer satisfies predetermined conditions. For example, if reset is imposed in the middle of data write from the microcomputer to an EEPROM or the like, the data may possibly change and this may cause a problem. To prevent this problem, the output control means 14 can block activation of the interrupt routine during data write, to prevent occurrence of reset.

Thus, according to the present invention, it is possible to suppress a variation in reset voltage because the reset voltage is generated based on a predetermined reference voltage output from a stabilized power supply circuit. In other words, the reset function can be operated with a fixed reset voltage common among microcomputers, and thus adjustment after fabrication is no more necessary.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A microcomputer comprising:
    a reset decision control section that generates a control signal; and
    a reset decision section that generates a reset signal instructing execution or non-execution of reset operation in response to the control signal,
    the reset decision section comprising:
        a stabilized power supply circuit for generating a predetermined reference voltage;
        a reset voltage generation circuit for generating a reset voltage based on the reference voltage generated by the stabilized power supply circuit; and
        a comparator for comparing a supply voltage applied to the microcomputer with the reset voltage, the reset signal being generated based on the comparison result from the comparator and the control signal.

2. The microcomputer of claim 1, wherein the reset decision control section comprises a timing control circuit that generates the control signal to operate the reset decision section intermittently.

3. The microcomputer of claim 1,
    wherein the reset decision control section generates the control signal to operate the reset decision section at a predetermined timing.

4. The microcomputer of claim 1,
    wherein the reset decision control section generates the control signal to operate the reset decision section at a predetermined timing when the microcomputer is in a normal mode, and to operate the reset decision section intermittently when the microcomputer is in a low current consumption mode.

5. The microcomputer of claim 1, wherein the stabilized power supply circuit is a band gap reference circuit.

* * * * *